United States Patent [19]

Drieskens et al.

[11] Patent Number: 5,601,642
[45] Date of Patent: Feb. 11, 1997

[54] BITUMINOUS COMPOSITIONS FOR SOUNDPROOFING MATERIALS

[75] Inventors: Bruno M. G. Drieskens, Sint-Gillis; Jean-Phillippe Hallet, Woluwe Sant-Pierre; Nicoles M. Lecouvet, Braine-L'Alleud, all of Belgium

[73] Assignee: Fina Research, S.A., Feluy, Belgium

[21] Appl. No.: 282,664

[22] Filed: Jul. 29, 1994

[30] Foreign Application Priority Data

Jul. 29, 1993 [BE] Belgium .............................. 09300793

[51] Int. Cl.$^6$ ................................................ C09D 195/00
[52] U.S. Cl. ............................................ 106/273.1; 524/68
[58] Field of Search ............................ 524/68; 106/273.1

[56] References Cited

U.S. PATENT DOCUMENTS

| | | | |
|---|---|---|---|
| 4,381,357 | 4/1983 | von der Wettern et al. | 524/68 |
| 4,923,913 | 5/1990 | Chich et al. | 524/62 |
| 5,336,705 | 8/1994 | Gorbaty et al. | 524/68 |
| 5,342,866 | 8/1994 | Trumbore et al. | 524/68 |

*Primary Examiner*—David Brunsman
*Attorney, Agent, or Firm*—Michael J. Caddell; M. Norwood Cheairs

[57] ABSTRACT

The present invention relates to bituminous compositions comprising oxidized bitumen and styrene-conjugated diene block copolymers for the manufacture of soundproofing materials. The use of said materials for the automotive soundproofing is also concerned.

6 Claims, No Drawings

BITUMINOUS COMPOSITIONS FOR SOUNDPROOFING MATERIALS

BACKGROUND OF THE INVENTION

The present invention relates to oxidized bitumen compositions which are modified with polymers, which can be used in the manufacture of soundproofing materials. More particularly, the present invention relates to bituminous compositions showing improved properties such as low volatility and high flow strength at high temperature. The present invention also relates to soundproofing materials made of the bituminous composition of the invention. More particularly, the present invention relates to materials designed for the automotive industry in order to soundproof the cars.

Bituminous compositions are known to be used in the building field since good characteristics are obtained in waterproofness use. Waterproofness systems for gardens-terraces which can contain oxidized bitumen reinforced with glass net or polyester are described in journal "Cahiers Techniques du Bâtiment" (N °90, p.113–118, 1987/"Building Technical Journal"). Elastomer bitumen compositions are also described, i.e. refining bitumen modified with either atactic polypropylene or styrene-butadiene-styrene (SBS). SBS elastomer bitumen used in waterproofness of roofs and structures are described in journal "Revue Générale Etanchéité Isolation" (Vol.30,N °113, P.13–17, 1978). It is specified therein that oxidized bitumen is not suitable for mixing with SBS because their asphaltene content is too high. WO93/07220 patent application discloses waterproofing laminates comprising a bituminous layer comprising 26 to 62 weight percent of oxidized bitumen, 21 to 65 weight percent process oil and 9 to 25 weight percent of a statistical styrene-butadiene copolymer.

In the automotive industry, it is known to use compositions comprising polyvinyl chloride (PVC), a terpolymer of the ethylene-propylene-diene monomer type (EPDM) and/or a copolymer of the ethylene-propylene type (EPM), oils and plasticizers for soundproofness. However some of these compositions are no more wanted because of their PVC content.

SUMMARY OF THE INVENTION

The present invention relates to bituminous compositions particularly suitable for the manufacture of soundproofing materials which are more particularly used for the soundproofness of cars. Further, the present invention relates to bituminous compositions and to soundproofing materials which are made of said compositions and which are easy to manufacture. The compositions according to the present invention show a low volatility and a high flow strength at high temperature, which are two important characteristics, particularly in the automotive industry.

DESCRIPTION OF THE PREFERRED EMBODIMENTS

The bituminous composition of the present invention is characterized in that it essentially comprises a mixture consisting in:

25 to 95 weight percent of oxidized bitumen, 5 to 75 weight percent of styrene-conjugated dienes block copolymers, 0 to 20 weight percent of process oil, the total representing 100 weight percent of the mixture.

The balance of the bituminous composition, if one, essentially consists in mineral fillers such as calcium carbonate, barium sulfate, talc, sand or others. The mineral filler is preferably made of calcium carbonate and/or barium sulfate.

The fillers generally represent from 0 to 90% based on the total composition weight, preferably from 50 to 85%.

According to a preferred embodiment of the present invention the bituminous composition essentially comprises a mixture consisting in:

40 to 70 weight percent of oxidized bitumen, 30 to 60 weight percent of styrene-conjugated dienes block copolymers, 0 to 10 weight percent of process oil, the total representing 100 weight percent of the mixture.

It has now unexpectedly been found that such a bituminous composition shows improved properties, particularly a low volatility and a high flow strength at high temperature.

The applicant has also found that it is now possible to have a homogeneous mixture made of an oxidized bitumen and a styrene-conjugated diene block copolymer.

The oxidized bitumen as used in the present invention is defined as follows: "bitumen whose rheological properties have been substantially modified by reaction with air at elevated temperatures". Preferably, the oxidized bitumen used in the present invention has a softening point (ball and ring temperature) comprised between 80° and 120° C. The oxidized bitumen having a penetration at 25° C. of 0 to 5 mm are preferentially used. Instead of oxidized bitumen, natural asphalt can also be used; natural asphalt is a hard bitumen found in natural deposits, containing mineral matter and which is virtually solid at 25° C. but which is a viscous fluid at 175° C. In this case the mineral fillers content of the composition will include the mineral fillers already present in the asphalt.

A specific advantage of the present invention is that the oxidized bitumen is solid at ambient temperature. It is usually available in block or in bags and it can be handled very easily which is not the case of refining bitumen.

Preferably, the styrene-conjugated dienes block copolymers used in the present invention can be chosen among linear and/or radial styrene-butadiene block copolymers, linear and/or radial styrene-isoprene block copolymers, styrene-butadiene di-block copolymers and mixtures thereof.

Preferably, the linear and/or radial styrene-butadiene block copolymers have a styrene content of about 20 to 77 wt % and a total molecular weight comprised between 70,000 and 300,000.

As example of appropriated linear and/or radial copolymers, coupled styrene-butadiene of the general formula S-B-(c)-B-S where (c) represents the coupling agent and styrene-butadiene-styrene (SBS) copolymers without coupling agent can be quoted.

Preferably, the linear and/or radial styrene-isoprene block copolymers have a styrene content of 10 to 45 wt %, preferably 10 to 35 wt %, and a total molecular weight comprised between 60,000 and 400,000, preferably between 100,000 and 150,000. As example of appropriated linear and/or radial copolymers, coupled styrene-isoprene and styrene-isoprene-styrene (SIS) can be quoted.

Preferably, the styrene-butadiene di-block copolymers have a styrene content of 15 to 45 wt %, preferably 20 to 35 wt %, and a total molecular weight comprised between 50,000 and 150,000, preferably between 50,000 and 100,000.

The di-block copolymer can be statistically joint which means that it contains a styrenic block and a styrene-butadiene block with statistical distribution.

According to a preferred embodiment of the present invention styrene-butadiene block copolymers will be used. According to another preferred embodiment of the present invention styrene-butadiene-styrene block copolymers having a radial structure and with a styrene content comprised between 20 and 35 wt % will be used.

Clearly, among styrene-conjugated dienes block copolymers appropriated for the present invention are also comprised their partially and totally hydrogenated derivatives.

The styrene-conjugated dienes block copolymers are well known in the state of the art. They are generally obtained during anionic polymerization in a solvent in the presence of a alkylmetallic catalyst like alkyllithium. They can be prepared during successive polymerization of styrene and diene when linear block copolymers are involved. In case that radial structure block copolymers are involved, copolymers able to comprise at least three branches are concerned, every branch comprises one polystyrene block and one polydiene block. This method is perfectly described especially in U.S. Pat. No. 3,281,383. It is understood that the here above described copolymers can comprise statistical parts for all that there are not beyond the scope of the present invention.

Many process oils can be used in the composition of the present invention. A process oil having the following carbon type distribution will be preferably used:

from 0 to 25% of aromatic carbon from 20 to 50% of naphtenic carbon from 40 to 80% of paraffinic carbon.

The bituminous compositions of the present invention can also contain from 0 to 25 wt % of one or more tackifier resins based on the bituminous composition without mineral fillers. The tackifier resins are well known in the art and are described especially in the U.S. Pat. No. 4738884. The role of the tackifier resins is well known by the man in the art.

According to the present invention, the preparation of the bituminous composition can be made in a very easy way, as example in Banbury type mixers or in extruders. Indeed this preparation is possible thanks to the use of oxidized bitumen which is very easy to handle as indicated hereabove. The styrene-conjugated dienes copolymers, the mineral filler and the process oils are simply introduced in the mixer successively or simultaneously with the oxidized bitumen.

Soundproofing materials can easily be manufactured with the bituminous compositions of the present invention; as example soundproofing sheets can be manufactured by calandering or by extrusion.

As example these soundproofing materials can be used in the automotive industry, in building as in the household appliances. Particularly, the materials of the present invention are used in the automotive industry in order to soundproof the vehicles such as cars, vans, trucks and others.

The present invention will now be described by the following examples which are not limitative.

EXAMPLES

The components are introduced and mixed during 15 minutes in a Banbury type mixer which is preheated at 80° C. (temperature lower than the bitumen softening point).

Thereafter the composition is homogenized on a roll mill and then extruded through a flat die.

3 mm plates having a density of about 2200 kg/m3 were so produced. The plates show good bend resistance and can be thermoformed. Further their volatile material content is low, especially for the composition 1 which does not contain oil.

Composition 1

75% calcium carbonate

12% styrene-butadiene radial copolymer molecular weight 135,000 styrene content 30%

13% oxidized bitumen having a ball and ring temperature (ASTM D 36-66) of 110° C. and a penetration index at 25° C. of 3 (mm) (ASTM D 5-65)

Composition 2

75% calcium carbonate

12% styrene-butadiene di-block copolymer molecular weight 75,000 styrene content 25%

3% process oil having the following carbon type distribution:

7% aromatic carbon

28% naphtenic carbon

65% paraffinic carbon

10% oxidized bitumen having a ball and ring temperature (ASTM D 36-66) of 110° C. and a penetration index at 25° C. of 3 (mm) (ASTM D 5-65)

We claim:

1. A soundproofing bituminous composition comprising the following mixture:

(a) 25 to 95 weight percent of oxidized bitumen;

(b) 5 to 75 weight percent of styrene-conjugated dienes block copolymers; and, (c) 0 to 20 weight percent of process oil, the total representing 100 weight percent of the mixture.

2. The soundproofing bituminous composition according to claim 1 characterized in that the mixture consists of:

(a) 40 to 70 weight percent of oxidized bitumen;

(b) 30 to 60 weight percent of styrene-conjugated dienes block copolymers; and, (c) 0 to 10 weight percent of process oil, the total representing 100 weight percent of the mixture.

3. The soundproofing bituminous composition according to claim 2 characterized in that styrene-butadiene-styrene block copolymers having a radial structure and with a styrene content of between 20 and 35 wt % are used.

4. A soundproofing bituminous composition according to claim 2, wherein the styrene-butadiene block copolymers have a radial structure and a styrene content of 20–35 weight percent.

5. The soundproofing bituminous composition according to claim 1 characterized in that the styrene-conjugated dienes block copolymers are chosen from among styrene-butadiene copolymers.

6. An automotive soundproofing material comprising any of the compositions of claims 1, 2, 3, 4 or 5.

* * * * *